United States Patent [19]

Cheng et al.

[11] Patent Number: 4,601,544
[45] Date of Patent: Jul. 22, 1986

[54] NEMATIC LIQUID CRYSTAL STORAGE DISPLAY DEVICE

[75] Inventors: Julian Cheng, Little Silver; Robert N. Thurston, Colts Neck, both of N.J.

[73] Assignee: AT&T Bell Laboratories, Murray Hill, N.J.

[21] Appl. No.: 788,673

[22] Filed: Oct. 17, 1985

Related U.S. Application Data

[63] Continuation of Ser. No. 434,522, Oct. 15, 1982, abandoned.

[51] Int. Cl.⁴ ............................................. G02F 1/13
[52] U.S. Cl. ................................. 350/334; 350/331 R; 350/341
[58] Field of Search ................... 350/330, 331 R, 334, 350/341, 346

[56] References Cited

U.S. PATENT DOCUMENTS 4,333,708  6/1982  Boyd et al. ..................... 350/334 X

OTHER PUBLICATIONS

J. Cheng et al., "Boundary-Layer Model of Field Effects in a Bistable Liqud-Crystal Geometry," J. Appl. Phys. 52(4), pp. 2756–2765 (1981).
R. N. Thurston et al., "Optical Properties of a New Bistable Twisted Nematic Liquid Crystal Boundry Layer Display," J. Appl. Phys., 53(6), pp. 4463–4479 (1982).
J. Cheng et al., "A Nematic Liquid Crystal Storage Display Based on Bistable Boundry Layer Configurations," Appl. Phys. Lett. 40(12), pp. 1007–1009, (1982).
DeGennes, P. G., *The Physics of Liquid Crystals*, pp. 188–191 (Clarendon Press, Oxford 1975).

Primary Examiner—John K. Corbin
Assistant Examiner—Richard F. Gallivan
Attorney, Agent, or Firm—Peter A. Businger

[57] ABSTRACT

A bistable nematic liquid crystal display cell is electrically switched between topologically equivalent, asymmetric horizontal states. The cell includes upper and lower parallel substrates, upper and lower topographically textured tilt alignment surfaces on the corresponding substrates, and nematic liquid crystal material between the substrates. In an active region of the cell, the tilt alignment surfaces form an unequal reverse tilt boundary condition. In an isolation region surrounding the active region of the cell, the tilt alignment surfaces are formed to avoid the reverse tilt boundary condition.

11 Claims, 7 Drawing Figures

NEMATIC LIQUID CRYSTAL STORAGE DISPLAY DEVICE

This application is a continuation of application Ser. No. 434,522, filed Oct. 15, 1982, abandoned.

CROSS-REFERENCE TO RELATED APPLICATIONS

U.S. patent application entitled "A Nematic Liquid Crystal Storage Display Device", Ser. No. 434,524, now abandoned, was filed in the U.S. Patent and Trademark Office concurrently herewith, and U.S. Patent application Ser. No. 788,108 was filed on Oct. 17, 1985 as a continuation application.

Also, U.S. patent application entitled "A Nematic Liquid Crystal Storage Display Device", Ser. No. 434,618, now abandoned, was filed in the U.S. Patent and Trademark Office concurrently herewith, and U.S. patent application Ser. No. 788,107 was filed on Oct. 17, 1985 as a continuation application.

TECHNICAL FIELD

This invention relates to display devices and, more particularly, to bistable liquid crystal devices.

BACKGROUND OF THE INVENTION

Bistable nematic liquid crystal display devices generally require large electric potentials to initiate interstate switching between bistable states. One important reason for such large electric switching potentials is that sufficient electric energy must be supplied to each display cell for detaching and moving disclinations from pinning sites.

One embodiment of a nematic liquid crystal display device exhibits configurational bistability between two states. See U.S. Pat. No. 4,333,708 issued to G. D. Boyd et al. on June 8, 1982. The two states, which exist separately in the absence of a holding potential, are topologically inequivalent and derive stability from disclination pinning. Interstate switching is accomplished by detaching and moving disclinations from a pinning site in response to an applied switching potential which exceeds a large, sharp switching threshold.

Reduction of the switching threshold level for this type of liquid crystal display device is achieved by prebiasing selected cells in the display with a small priming potential prior to applying the larger switching potential. See, for example, copending U.S. patent application, Ser. No. 411,305, filed Aug. 25, 1982. Although the switching level is lower for the latter nematic liquid crystal display device, the switching level remains sufficiently high, for example, on the order of one hundred volts, to ensure detachment and motion of the disclinations necessary to achieve interstate switching.

In both of the above display devices, the problems of relatively large switching potentials and switching by disclination motion still exist.

SUMMARY OF THE INVENTION

Small applied switching potentials, for example, less than ten volts, initiate interstate switching between two topologically equivalent horizontal states of a bistable nematic liquid crystal display cell wherein the cell comprises upper and lower substrates, nematic liquid crystal material disposed between both substrates and a combination of elements integrally connected to the substrates capable of preferentially orienting directors of the liquid crystal material into an asymmetric horizontal state having an inversion layer substantially adjacent and parallel to a predetermined substrate in the presence of a particular applied electric potential.

In one embodiment of the invention, the liquid crystal display cell comprises upper and lower parallel substrates having electrically conductive strips and topographically textured tilt alignment surfaces disposed thereon, a nematic liquid crystal material disposed between opposing textured surfaces and a source of variable potential connected to the conductive strips for generating electric switching fields through the liquid crystal material. Different surface tilt angles are employed on portions of the tilt alignment surfaces for preferentially attracting predetermined orientational director alignments under the influence of the switching fields. A cell is divided into an active region and an isolation region which surrounds the active region. In the active region of the cell, the opposing textured tilt alignment surfaces exhibit an unequal reverse tilt boundary condition and a twist or angular difference between azimuthal orientations of the opposing textured tilt alignment surfaces. On at least one textured tilt alignment surface, there is an orientational discontinuity between surface tilt angles of the active and corresponding isolation regions. Interstate switching is performed by applying a first potential greater than a critical potential to the cell to align the orientational directors in a first asymmetric horizontal state. Transitions to the second state are accomplished by applying a second potential, related to the first potential, to the cell in order to properly align the orientational directors in a second asymmetric horizontal state.

BRIEF DESCRIPTION OF THE DRAWING

A more complete understanding of the invention may be obtained by reading the following description of a specific illustrative embodiment of the invention in conjunction with the appended drawings in which.

DETAILED DESCRIPTION

A new bistability effect is shown for nematic liquid crystals wherein two topologically equivalent states are maintained by a small applied holding potential. Each state exhibits a boundary inversion layer containing substantially horizontally aligned orientational directors adjacent to a corresponding boundary. Switching from one state to another requires no disclination motion because of the topological equivalence of the states.

Figure 1:
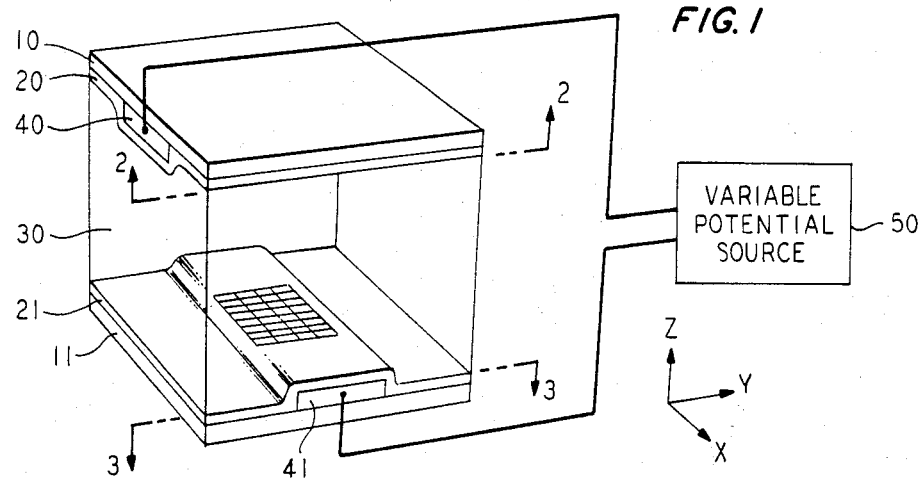
FIG. 1 shows a three-dimensional view of a liquid crystal display cell.

A liquid crystal display cell is shown in FIG. 1. This display cell is one exemplary embodiment of the invention. In this cell, varying tilt angles on different portions of each topographically textured tilt alignment surface are used to ensure that one state is favored over the other state under the influence of a predetermined electric field. Other embodiments will be briefly described below.

The cell in FIG. 1 comprises only a portion of an entire liquid crystal display. As shown in FIG. 1, the cell includes upper substrate 10, lower substrate 11, upper topographically textured tilt alignment surface 20, lower topographically textured tilt alignment surface 21, nematic liquid crystal material 30, upper conductor 40, and lower conductor 41. Switching and holding potentials are supplied to the cell from variable potential source 50 connected to upper conductor 40 and lower conductor 41. A set of basis vectors (x,y,z) is shown in the Figures to assist in orienting FIG. 1 with respect to FIGS. 4 through 7.

Substrates 10 and 11 support conductors 40 and 41, respectively, as well as provide a means for containing liquid crystal material 30. Each substrate is composed primarily of a transparent dielectric material such as silicon dioxide or glass or the like.

Conductors 40 and 41 are disposed on an inner opposing surface of each respective substrate in order to permit an electric field to be imposed substantially perpendicular to each substrate. Both interdigital electrodes and continuous uniform strip electrodes are arrangements suitable for use as conductors 40 and 41.

As shown in FIG. 1 for illustrative purposes only, conductors 40 and 41 are continuous uniform strip electrodes orthogonally disposed with respect to each other. Conductor 40 is formed on an inner surface of upper substrate 10, while conductor 41 is similarly formed on an inner surface of lower substrate 11 in a direction orthogonal to the direction of conductor 40. Each conductor is deposited or etched by conventional photolithographic techniques as a thin film on the inner surface of the respective substrate. Transparent films such as indium tin oxide are used as conductors on both substrates of transmission mode display cells, whereas opaque films comprised of aluminum, for example, are used for conductors on one substrate in reflection mode display cells.

Topographically textured tilt alignment surfaces 20 and 21 are utilized to induce a known tilt alignment of the liquid crystal molecules adjacent to each surface. These surfaces have also been called tilt alignment surfaces. Surfaces 20 and 21 are transparent layers on the exposed inner surfaces of the substrates and conductors for defining surface alignment of the orientational directors of liquid crystal material 30. Surfaces 20 and 21 are integrally connected to each respective substrate by oblique electron beam deposition or thermal evaporation of a material such as titanium oxide or silicon oxide, both of which act as insulators. This results in a uniformly tilted columnar topography for each tilt alignment surface. The topography on each of surfaces 20 and 21 defines a surface tilt angle $\theta_0$ measured from each substrate normal (inner surface) in the range 0 degrees to 90 degrees. Surface tilt angles greater than 45 degrees are preferred in order to ensure dominance of the horizontal orientational director configuration. Tilt alignment surfaces 20 and 21 are more completely described below in reference to FIGS. 2 and 3.

Liquid crystal material 30 is a liquid crystal substance in the nematic mesophase having positive dielectric anisotropy at least in some frequency range. In an exemplary display cell, material 30 is comprised of cyanobiphenyl samples of E7 from Merck Chemical Company. Liquid crystal material 30 is disposed between opposite, parallel substrates wherein the surface to surface separation of the substrates is less than 20 μm and, typically, is about 10 μm.

Each display cell is partitioned into an active region and an inactive region. The active region includes a volume of liquid crystal material 30 which is capable of interstate switching in response to appropriately applied electric fields. In general, for the type of cell shown in FIG. 1, the active region is defined as that region between the overlap of conductors 40 and 41. In FIG. 1, a lower boundary of the active region is shown as the crosshatched area on surface 21.

The inactive region surrounding each active region is a volume of liquid crystal material which maintains a fixed orientational director configuration regardless of the configurations in adjacent active regions. Each inactive region, also known as a neutral isolation region, separates, isolates and stabilizes the surrounded active region of a corresponding cell in the liquid crystal display. A theory of neutral isolation regions is explained by J. Cheng in "Surface Pinning of Disclinations and the Stability of Bistable Nematic Storage Displays," J. Appl. Phys. 52, pp. 724–727 (1981). Also, in this regard, the material contained in U.S. patent application, Ser. No. 252,148, filed Apr. 8, 1981, by J. Cheng (now U.S. Pat. No. 4,400,060, issued Aug. 23, 1983) is expressly incorporated herein.

Additional information concerning physical aspects and construction of the basic display cell shown in FIG. 1 is contained in both U.S. Pat. No. 4,333,708 issued to G. D. Boyd et al. on June 8, 1982 and U.S. patent application, Ser. No. 375,670 filed May 6, 1982 (now U.S. Pat. No. 4,472,026, issued Sept. 18, 1984). In this regard, pertinent material from each of the above-identified references is expressly incorporated herein by reference.

Variable potential source 50 generates several electrical signals which are supplied to upper conductor 40 and lower conductor 41 to impose various switching electric fields through liquid crystal material 30 and substantially normal to substrates 10 and 11. Depending upon the characteristics of the switching electric field imposed in the active region of the display cell, the orientational director configuration of liquid crystal material 30 is transformed through a distorted horizontal configuration (FIG. 5) into either an upper asymmetric horizontal state (FIG. 6) or a lower asymmetric horizontal state (FIG. 7). After switching to an asymmetric state is completed, source 50 generates a holding signal to maintain the asymmetric horizontal state in the display cell with a holding potential.

Signals generated by source 50 are generally from the family of constant envelope signals and, more particularly, of substantially constant envelope, gated, AC pulse signals. Constant envelope AC signals are preferred to constant amplitude or DC signals because the latter signals give rise to space charge polarization effects which reduce the amplitude of the applied electric field.

In order to carry out switching in accordance with the principles of this invention, signals from source 50 generate potentials referenced to a critical potential $V_c$, which is described in more detail below. The signals are classified into three broad categories, namely, a write signal, an initialization or erase signal, and a holding signal. A write signal from source 50 supplies a potential of magnitude $V_W$ across the display cell to initiate switching of the cell to a first (upper or lower) asymmetric horizontal state, where potential $V_W$ slightly exceeds critical potential $V_c$. An erase signal supplies a potential of magnitude $V_E$ across the display cell to initiate switching of the cell to a second (lower or upper) asymmetric horizontal state, where $V_E$ is greater than both $V_W$ and approximately three times $V_c$ ($3V_c$). A holding signal is generated by source 50 to maintain orientational directors in the particular asymmetric horizontal state to which they have been switched. The holding signal creates a potential of magnitude $V_H$ across the cell, wherein $V_H$ is at least greater than the critical potential $V_c$. Holding potential magnitude $V_H$ can be increased to improve contrast between the first and second asymmetric horizontal states. It should be noted that potentials $V_E$, $V_H$, $V_W$ and $V_c$ depend upon the dimensions and other characteristics of the liquid crystal display cell. However, by way of example, it is known that, for a thin cell (10 μm intersubstrate separation) containing E7, preferred potentials are $V_c = 1.5$ volts, $V_W$ is between 1.5 volts and 5.0 volts, $V_E$ is above 5.0 volts, and $V_H$ is less than 10.0 volts. More detailed information concerning variable potential source 50 and bistable switching of the liquid crystal display cell is given below with respect to FIGS. 5 through 7.

Figure 2:
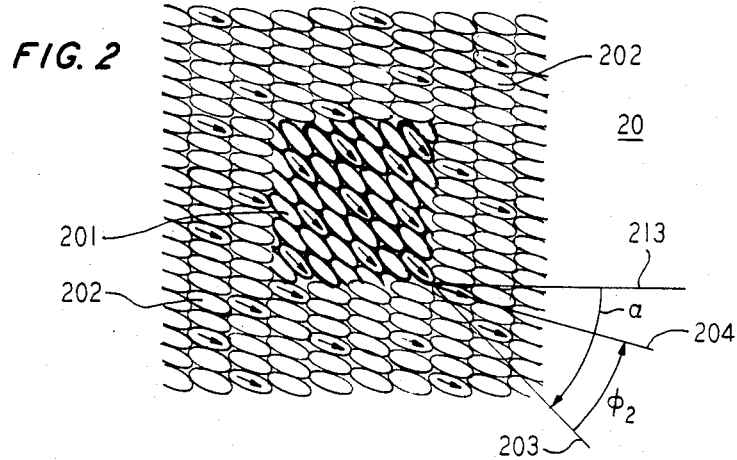
FIG. 2 shows a conceptual rendering of upper topographically textured tilt alignment surface 20 as viewed from line 2—2 in FIG. 1.

FIG. 2 shows a view of upper tilt alignment surface 20 from a position along line 2—2 in FIG. 1. Tilt alignment surface 20 includes active region surface 201 (dark outlined ellipses) and isolation region surface 202 (light outlined ellipses). Ellipses have been drawn to represent tilted molecular columns in the tilted topography of surface 20. Along the major axis of each of several ellipses, a vector has been drawn as an orthogonal projection of the major axis of each ellipse, i.e., the molecular axis of a column, onto the tilt alignment surface. The vector indicates a direction of surface tilt for the columns and, hence, a direction of azimuthal bias for the tilt alignment surface.

Azimuthal bias for an active region surface is measured as an angular displacement from a reference line. In the Figures, line 213 is the reference line. Line 203 indicates the direction of azimuthal bias for active region surface 201 at angle $\alpha$, where $\alpha$ is an acute angle between −90 degrees and +90 degrees.

Azimuthal bias for an isolation region surface is measured from the bias direction line for the corresponding active region surface. Hence, line 204 indicates the direction of azimuthal bias of isolation region surface 202 at angle $\phi_2$ from bias line 203.

Figure 3:
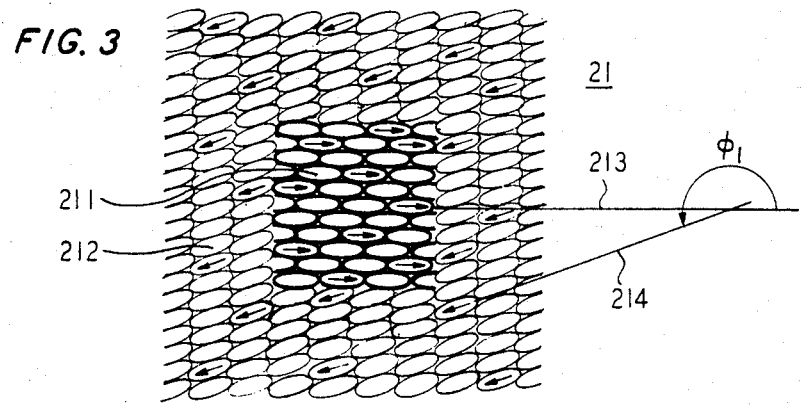
FIG. 3 shows a conceptual rendering of lower topographically textured tilt alignment surface 21 as viewed from line 3—3 in FIG. 1.

FIG. 3 shows a view of lower tilt alignment surface 21 from a position along line 3—3 in FIG. 1. Surface 21 includes active region surface 211 (dark outlined ellipses) and isolation region surface 212 (light outlined ellipses). Reference line 213 also shows the direction of azimuthal bias for active region surface 211 so that the azimuthal bias for surface 211 is zero degrees. The azimuthal bias for surface 212 is at an angle $\phi_1$. In a preferred embodiment of the invention, angles $\phi_1$ and $\phi_2$ are substantially equal to 180 degrees and 0 degrees, respectively.

In the active region of the display cell, surfaces 20 and 21 form a reverse tilt boundary condition. Reverse tilt occurs because the azimuthal bias $\alpha$ of surface 201 is between −90 degrees and +90 degrees and, when measured as an acute angle from each respective substrate normal (inner surface), the surface tilt angle for surface 201 has an opposite polarity to the surface tilt angle for surface 211. For example, as shown in FIGS. 2 and 3, the surface tilt angle for surface 201 is measured counterclockwise from the inner surface normal of substrate 10 as an acute angle, whereas the tilt angle for surface 211 is measured clockwise from the inner surface normal of substrate 11. As stated above, the surface tilt angles for surfaces 201 and 211 are desired to have absolute values in the range 0 degrees to 90 degrees from the respective substrate normals and, more preferably, greater than 45 degrees. Furthermore, it is important to the principles of the invention that the reverse tilt be unequal so that the absolute-valued tilt angle of surface 201 is different from the absolute-valued tilt angle for surface 211. By way of example, it can be assumed that the tilt angle for surface 211 is less than the tilt angle for surface 201.

To increase the tilt angle of the one surface with respect to another, surfactants, such as a thin film of a plasma polymerized fluorohydrocarbon (e.g., a 30 Å layer of polytetrafluoroethylene) are deposited over at least the active region surface to have the greater tilt angle. This type of surface treatment is described in W. R. Heffner et al., Appl. Phys. Lett. 36(2), pp. 144–146 (1980). A double evaporation technique can also be utilized for alignment surface preparation as described by D. Meyerhofer in an article from Appl. Phys. Lett., 29(11), pp. 691–692 (1976).

In the isolation region, surfaces 20 and 21 from a boundary condition in which the surface tilt angles are tilted in the same sense, when measured as an acute angle with respect to the inner surface normals on the respective substrates, provided that $\phi_2 < \alpha$ and 90 degrees $< \phi_1 < 270$ degrees. That is, isolation region surfaces 202 and 212 have acute surface tilt angles measured counterclockwise from their respective substrate normals (see FIGS. 2 and 3). Moreover, it has been found that, for ease in fabrication, the surface tilt angles of surfaces 201 and 202 be made equal to result in a uniform tilt across tilt alignment surface 20 which is equal in polarity and magnitude to the tilt angle for surface 212.

It is apparent from the description above and from FIG. 3 that a tilt reversal or alternating tilt condition exists on lower tilt alignment surface 21. This tilt reversal causes an orientational discontinuity to occur along the interfacial boundary between the surface tilt angles for active region surface 211 and isolation region surface 212. The orientational discontinuity is suitable for pinning disclinations in order to suppress switching of the orientational directors to the vertical configuration and for nucleating domain walls in proximity to surface 211 which are utilized in one type of interstate switching.

Upper and lower tilt alignment surfaces are important, individually and in combination, to bistable switching of the liquid crystal display cell. Upper and lower tilt alignment surfaces are fabricated to introduce sufficient asymmetry in the display cell for stabilizing preferentially one asymmetric horizontal state over the other in the presence of a particular switching electric field and for providing optical differentiation of the asymmetric states. Particularly, the difference between the azimuthal biases of the upper and lower active region surfaces provides optical differentiation between the bistable states. A difference between the surface tilt angles on the active region surfaces causes one asymmetric horizontal state to be established under the proper electric field conditions nearer to the surface having a larger surface tilt angle. Finally, the tilt alignment surface exhibiting a larger orientational discontinuity between the surface tilt angles of isolation and active region surfaces allows the other asymmetric horizontal state to be established nearer to the corresponding active region surface under proper electric field conditions. These features will become more apparent with reference to the description of FIGS. 4 through 7 below.

Figure 4:
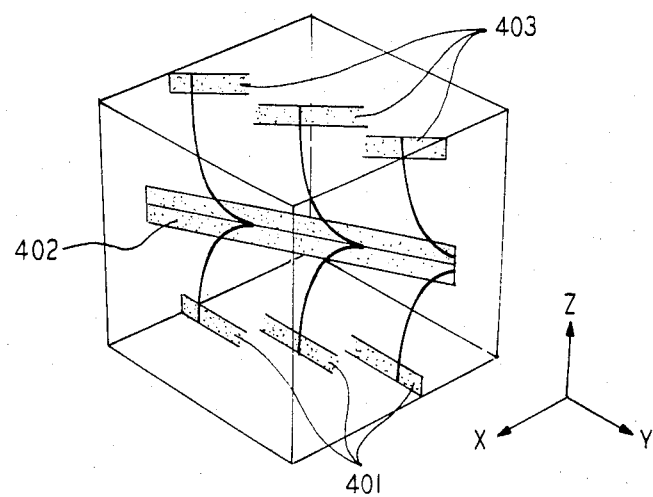
FIGS. 4 through 7 illustrate various horizontal orientational director alignments within the active region in the display cell of FIG. 1 in accordance with the principles of the invention.

FIG. 4 shows a three-dimensional view of the volume of liquid crystal material in the active region of the display cell depicted with the orientational directors in an undistorted horizontal configuration. This is the quiescent configuration of the cell because the orientational directors of the liquid crystal material assume this configuration in the absence of an electric field. Planar section 401 of a boundary layer contain directors of the liquid crystal material oriented substantially at the surface tilt angle of surface 211, while planar sections 403 of a boundary layer contain directors oriented at the surface tilt angle of surface 201. Planar section 402 of an inversion layer contains orientational directors which are substantially horizontal or substantially parallel to each substrate surface.

For simplicity, FIG. 4 shows only enough detail to see planar section 402 as a single section of coplanar orientational directors in the inversion layer. Clearly, there are a plurality of identical planar sections parallel to planar section 402 which comprise the entire inversion layer. Similarly, there are corresponding pluralities of identical planar sections parallel to each of planar sections 401 and 403 which comprise boundary layers at surfaces 20 and 21, respectively. This simplification of detail has also been applied to FIGS. 5, 6 and 7.

Orientational director alignment evolves from the undistorted horizontal configuration through a series of unique, potential dependent, horizontal configurations to the distorted horizontal configuration as the potential is increased through the display cell. The bistable asymmetric horizontal states are suppressed until a potential equal to or greater than the critical potential is applied to the display cell. Critical potential $V_c$ is defined as the potential above which liquid crystal material 30 behaves in a bistable manner with respect to horizontal configurations. The critical potential is described as follows. Assume that the boundary and inversion layers are completely separated and exhibit uniform splay-bend distortion energy $U_o$ per unit volume where $$U_o = \frac{\bar{k}}{2}\left[\frac{\pi}{2\xi}\right]^2,$$

and $$\xi = \frac{1}{E}\left[\frac{4\pi \bar{k}}{\Delta \epsilon}\right]^{\frac{1}{2}}$$

where $\xi$ is the electric coherence length defined as the characteristic distance in which liquid crystal molecules with mean spray-bend modulus $\bar{k}$ and dielectric anisotropy $\Delta\epsilon$ rotate from perpendicular to parallel with respect to an applied electric field E. The energy density per unit area of each boundary layer is proportional to the thickness of the particular layer as shown in the table below:

| Layer Type (Reference Numerals) | Thickness | Energy Density Per Unit Area |
|---|---|---|
| Boundary (501, 503) | $\xi/2$ | $U_o\xi/2$ |
| Inversion (502) | $2\xi$ | $2U_o\xi$ |
| Boundary Inversion (504, 505) | $\frac{3}{2}\xi$ | $\frac{3}{2}U_o\xi$ |

Figure 5:
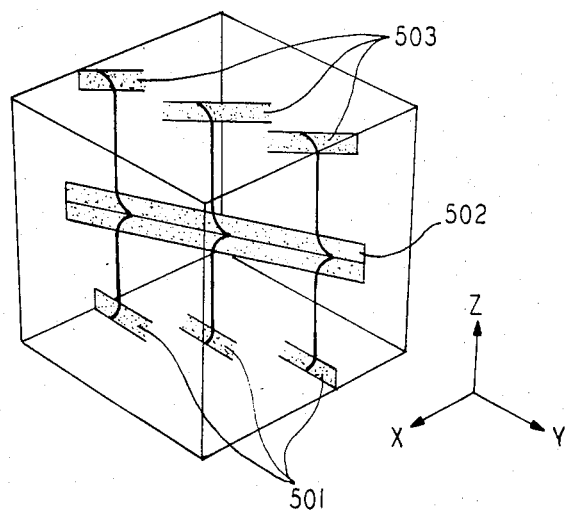
Figure 6:
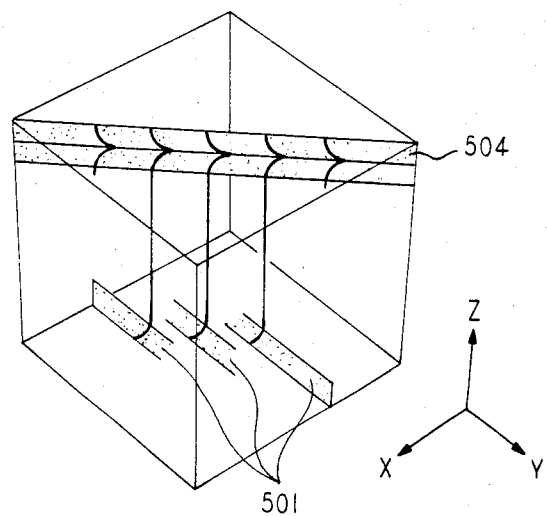
Figure 7:
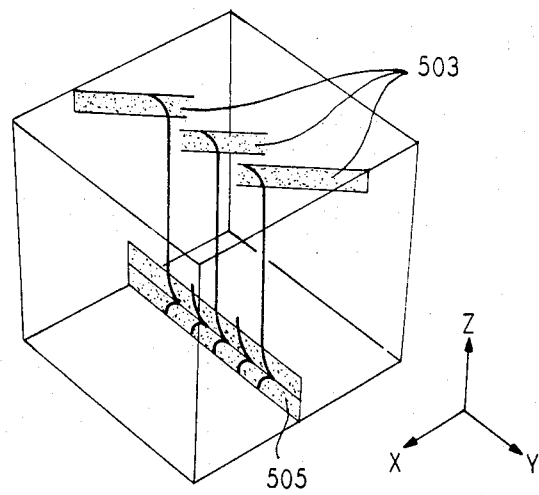

From the table above, it is clear that the distorted horizontal configuration shown in FIG. 5 has a total energy per unit area of $3U_o\xi$, whereas the asymmetric horizontal states of FIGS. 6 and 7 each have total energy per unit area of $2U_o\xi$. However, the argument presented is not valid for an applied field for which the boundary and inversion layers merge across the total thickness, d, of the display cell. Therefore, the cell thickness d is at least equal to $3\epsilon$ and the critical potential is given by the relation, $$V_c = dE_c = 3\xi E_c.$$

For a sample of cyanobiphenyl E7 and absolute-valued surface tilt angles of approximately 53 degrees, the critical potential $V_c$ is approximately 1.5 to 1.7 volts.

When a potential greater than critical potential $V_c$ is applied to the display cell, the orientational directors of the active region are transformed into a distorted horizontal configuration as shown in FIG. 5. The distorted horizontal configuration contains planar sections 501 of the lower boundary layer, planar section 502 of the inversion layer and planar sections 503 of upper boundary layer, hereinafter referred to, respectively, as lower boundary layer 501, inversion layer 502, and upper boundary layer 503. This state is unstable because the overall elastic and dielectric energy of the orientational director configuration can be lowered when inversion layer 502 merges with either upper boundary layer 503 (FIG. 6) to form the upper asymmetric horizontal state or with lower boundary layer 501 (FIG. 7) to form the lower asymmetric horizontal state. Both resulting asymmetric horizontal states have equal energy, are topologically equivalent, and are separated by an energy barrier represented by the distorted horizontal configuration.

If the potential applied to the cell in the distorted horizontal configuration is $V_W$ corresponding to the write signal from source 50, the distorted horizontal configuration (FIG. 5) is transformed into the upper asymmetric horizontal state shown in FIG. 6. The transformation occurs by direct vertical movement of inversion layer 502 toward boundary layer 503. This results in the formation of boundary inversion layer 504 adjacent to active region surface 201 of surface 20 because the surface tilt angle of surface 201 is greater than the surface tilt angle for surface 211. Holding potential $V_H$ is then applied to the cell via the holding signal from source 50 to maintain the upper asymmetric horizontal state. Orientational directors in boundary inversion layer 504 reside in the plane which includes both the substrate normal and the azimuthal bias line for active region surface 201, i.e., line 203.

On the other hand, if the potential applied to the cell in the distorted horizontal configuration is $V_E$ corresponding to the erase signal from source 50, the distorted horizontal configuration is transformed into the lower asymmetric horizontal state shown in FIG. 7.

The transformation occurs by nucleation of boundary inversion layer 505 adjacent to the outer perimeter of active region surface 211 on surface 21 because of the discontinuities at the interface between surfaces 211 and 212. A domain wall propagates inward from the discontinuities at the nucleation site toward the center of the cell to complete switching to the lower asymmetric horizontal state. Holding potential $V_H$ is then applied to the cell via the holding signal from source 50 to maintain the lower asymmetric horizontal state. Orientational directors in boundary inversion layer 505 reside in a plane which includes both the substrate normal and the azimuthal bias line for active region surface 211, i.e., line 213.

Interstate switching between asymmetric horizontal states, for example, upper-to-lower or lower-to-upper, is accomplished by extinguishing the holding signal to the cell and allowing liquid crystal material 30 to relax momentarily into the distorted horizontal configuration (FIG. 5) or the undistorted horizontal configuration (FIG. 4). After a short relaxation period, a write signal or an erase signal is supplied to the cell to complete the switching appropriately.

It should be noted that the cell will relax into a substantially undistorted horizontal configuration in the presence of any potential less than or even slightly above the critical potential $V_c$. Hence, interstate switching may also be performed by lowering the potential on the cell from the holding potential level to a level slightly above or below the critical potential.

It is advantageous to the operation of the display cell in either asymmetric state for the orientational directors to be inhibited from switching to a vertical configuration. Vertical configuration switching is capable of being prevented by operating variable potential source 50 below the threshold level at which detachment of disclinations occurs. This threshold level is generally found to be on the order of 60 volts.

Although not shown in the Figures, an appropriate combination of linear polarizers and perhaps a fixed retarder plate can be employed to enhance the optical contrast between the asymmetric states.

As described above, one exemplary embodiment of the invention has been described utilizing surface tilt angle differences on the tilt alignment surfaces. It should be apparent from this detailed description that other means are available for breaking the symmetry between upper and lower surfaces of the cell to produce nucleation of a domain wall on the surface producing greater stress in the liquid crystal material. For example, a difference between azimuthal biases of isolation and active region surfaces on each tilt alignment surface ($\phi_1$, $\phi_2$) can be incorporated into the structure of the display cell together with an unequal reverse tilt boundary condition in the active region. Assume that $\phi_2$ is greater than $|\phi_1 \bmod 180 \text{ degrees}|$, that the surface tilt angle of active region surface 201 is greater than the surface tilt angle of active region surface 211, and that the surface tilt angle in each isolation region is 90 degrees to create a parallel tilt boundary condition. In such an embodiment, the liquid crystal material is subject to greater stress on surface 21 than on surface 20. Hence, a domain wall is easily nucleated near surface 21 when an erase signal is applied to the cell. Writing is accomplished in an identical manner to the first described embodiment.

Although several embodiments of the invention have been described, it will be apparent to a person skilled in the art that various modifications to the details shown and described may be made without departing from the spirit and scope of the invention. For example, interstate switching may be accomplished by varying the rise time of the various switching signals. Particularly, a write signal can be generated as a signal having a long rise time, increasingly slowly from a level below the critical potential $V_c$ to the holding potential $V_H$. Similarly, the erase signal can be generated as a fast rise time signal, increasing rapidly from a level below the critical potential to the holding potential $V_H$. In a similar fashion, it is also possible to make use of the two frequency behavior of liquid crystal material 30 for interstate switching. For two frequency operation, a low frequency signal at potential $V_W$ is used for writing, a low frequency signal at potential $V_E$ is used for erasure, and a high frequency signal is utilized for accelerated relaxation to the substantially undistorted horizontal configuration.

What is claimed is:

1. A liquid crystal display cell capable of being switched to a first state under the influence of a first electric potential and to a second state under the influence of a second electric potential, switching between said first state and said second state being in the absence of movement of a disclination in said display cell, the cell comprising first and second substrates, and a nematic liquid crystal material having orientational directors disposed between both substrates, the cell comprising means integrally connected to each substrate for preferentially attracting an inversion layer of orientational directors to be substantially adjacent and parallel to the first substrate so that the directors are aligned in the first state.

2. The display cell as defined in claim 1 wherein the attracting means includes, on at least a portion of an interior surface of each substrate, a topographically textured surface uniformly tilted with respect to the adjacent substrate normal by an acute surface tilt angle, the tilt angle for the topographically textured surface on the first substrate being greater than and of opposite polarity to the tilt angle for the topographically textured surface on the second substrate so that both topographically textured surfaces form an unequal reverse tilt boundary condition.

3. The display cell as defined in claim 2 wherein each topographically textured surface has an azimuthal bias with respect to a predetermined reference line.

4. The display cell as defined in claim 3 wherein the topographically textured surface on the first substrate has an azimuthal bias angle which is in the range from −90 degrees to +90 degrees, exclusively, and wherein the topographically textured surface on the second substrate has an azimuthal bias angle of 0 degrees.

5. A liquid crystal display cell capable of being switched to a first state under the influence of a first electric potential and to a second state under the influence of a second electric potential, switching between said first state and said second state being in the absence of movement of a disclination in said display cell, the cell comprising first and second substrates, and a nematic liquid crystal material having orientational directors disposed between both substrates, the cell comprising first means integrally connected to each substrate for preferentially attracting an inversion layer of orientational directors to be substantially adjacent and parallel to the first substrate so that the directors are aligned in the first state, and the cell comprising second means integrally connected to each substrate for preferentially attracting the inversion layer to be substantially adjacent and parallel to the second substrate so that the directors are aligned in the second state.

6. The display cell as defined in claim 5 wherein the first attracting means includes, on a first portion of an interior surface of each substrate, a topographically textured surface uniformly tilted with respect to the adjacent substrate normal by an acute surface tilt angle, the angle for the topographically textured surface on the first substrate being greater than and of opposite polarity to the angle for the topographically textured surface on the second substrate so that both topographically textured surfaces form an unequal reverse tilt boundary condition.

7. The display cell as defined in claim 6 wherein each topographically textured surface has an azimuthal bias with respect to a predetermined reference line.

8. The display cell as defined in claim 7 wherein the topographically textured surface on the first substrate has an azimuthal bias angle in the range from −90 degrees to +90 degrees, exclusively, and the topographically textured surface on the second substrate has an azimuthal bias angle of 0 degrees.

9. The display cell as defined in claim 8 wherein the second attracting means includes, on a second portion of the interior surface of the second substrate surrounding the first portion, a topographically textured surface uniformly tilted with respect to the adjacent substrate normal by an acute surface tilt angle, the angle on the second portion of the surface being of opposite polarity to the angle on the first portion of the same surface so that an orientational discontinuity is formed thereon.

10. The display cell as defined in claim 8 wherein the second attracting means includes, on a second portion of the interior surface of each substrate surrounding each first portion, a topographically textured surface both uniformly tilted with respect to the adjacent substrate normal by an acute surface tilt angle and having an azimuthal bias with respect to the topographically textured surface on the first portion of the same substrate.

11. The display cell as defined in claim 10 wherein the azimuthal bias for the second portion of the interior surface of the first substrate is greater than the azimuthal bias for the second portion of the interior surface of the second substrate.

* * * * *